(No Model.)
F. J. BOSSE.
FLY PAPER.
No. 391,014. Patented Oct. 16, 1888.
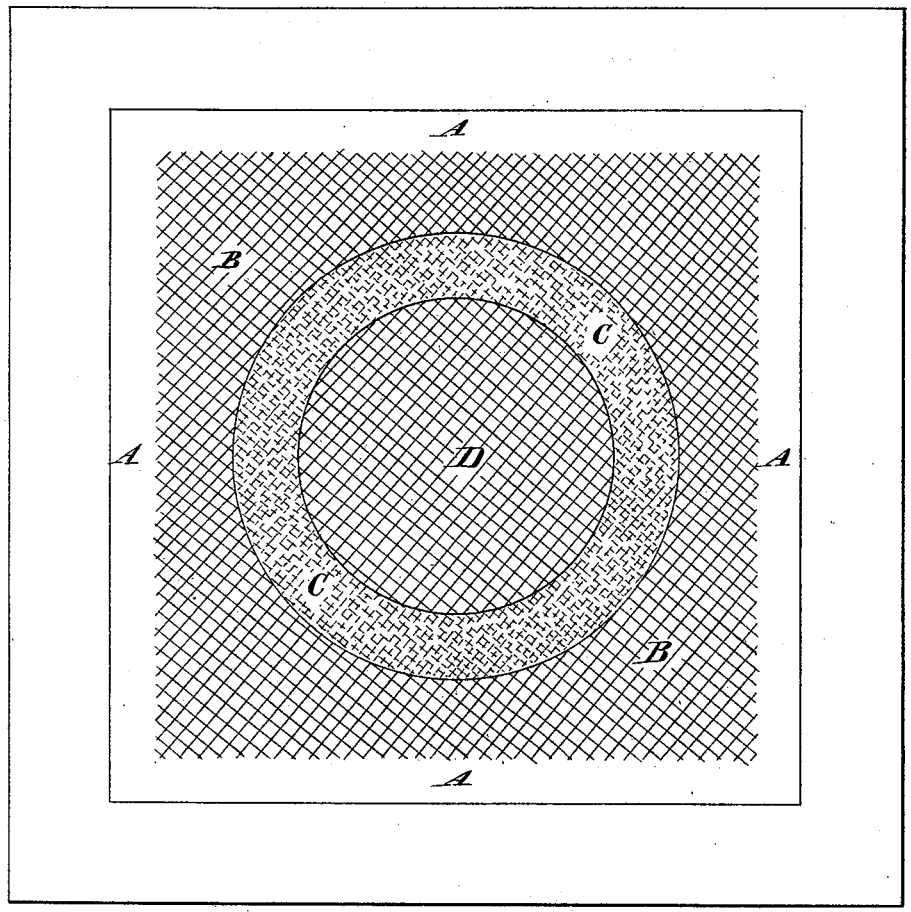
WITNESSES:
Charles R. Searle
Moses Lemon
Frederick J. Bosse
INVENTOR.
BY Benjamin Patterson
ATTORNEY.

United States Patent Office.

FREDERICK J. BOSSE, OF BROOKLYN, NEW YORK, ASSIGNOR OF ONE-HALF TO SIMON NEWMAN, OF SAME PLACE.

FLY-PAPER.

SPECIFICATION forming part of Letters Patent No. 391,014, dated October 16, 1888.

Application filed May 22, 1888. Serial No. 274,636. (No specimens.)

*To all whom it may concern:*

Be it known that I, FREDERICK J. BOSSE, a citizen of the United States, residing at Brooklyn, Kings county, and State of New York, have invented certain new and useful Improvements in Insect-Paper; and I do hereby declare that the following is a full, clear, and exact description of the invention, which will enable others skilled in the art to which it appertains to make and use the same.

The object of my invention is to attract and catch innumerable insects—as flies, mosquitoes, moths, &c.—by self-luminous and sticky substances upon paper. I will illustrate by the accompanying drawing, in which—

A is the surface of the plain paper, B B the surface covered by a sticky substance, and C the surface covered by the self luminous substance.

More fully, my invention consists of a sheet of paper of any convenient size coated with any convenient sticky glue all over its surface, except a margin of about one and one-half inch (for convenience of handling) and some parts between the edges and the center. This latter part is preferably limited by two concentric circles, the inner one of which comes nearer to the edges than the center of the paper, the whole of which part forms a surface of about one-twentieth of that of the whole paper. This said part is coated with a self-luminous substance, consisting, principally, of the sulphide of calcium, the term "self-luminous substance" being applied to such compound as will be able to emit light in darkness after having been previously exposed to daylight or strong artificial light.

The character of the self-luminous substance is as follows: The sulphide of calcium, made in the dry way out of the sulphate of calcium by the process generally known to chemists, is put into any vehicle that will become dry, and thereby exclude the air, and at the same time not produce any chemical changes in the sulphide of calcium. I use as such a vehicle a mixture of equal quantities of cold-pressed linseed-oil and spirits of turpentine, or for inferior grades a common mucilage of gum-arabic.

Heretofore insect-paper for attracting and catching insects was made of paper covered by some sticky or poisonous substance only; and the paper having a self-luminous substance and a sticky substance for attracting and catching insects is entirely new. I claim neither of the substances as my invention.

What I desire to claim and secure by Letters Patent is—

A fly-paper having a part covered with a self-luminous substance, and having the remaining parts adjacent to this luminous substance covered with a sticky substance, the former for the purpose of attracting insects and the latter for the purpose of catching and detaining them, as set forth.

FREDERICK J. BOSSE.

Witnesses:
WERNER BRUNS,
J. T. WALSH.